United States Patent
Kashima

(10) Patent No.: US 7,256,847 B2
(45) Date of Patent: Aug. 14, 2007

(54) BOARD WITH CHOLESTERIC LAYER AND DISPLAY HAVING THE BOARD

(75) Inventor: Keiji Kashima, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 54 days.

(21) Appl. No.: 10/250,650

(22) PCT Filed: Nov. 11, 2002

(86) PCT No.: PCT/JP02/11618

§ 371 (c)(1),
(2), (4) Date: Jul. 7, 2003

(87) PCT Pub. No.: WO03/040815

PCT Pub. Date: May 15, 2003

(65) Prior Publication Data

US 2004/0051830 A1     Mar. 18, 2004

(30) Foreign Application Priority Data

Nov. 7, 2001  (JP)  ............................. 2001-342059
Aug. 12, 2002 (JP)  ............................. 2002-234950

(51) Int. Cl.
*G02F 1/1335* (2006.01)

(52) U.S. Cl. .................... 349/115; 349/98; 349/113; 349/114; 349/106

(58) Field of Classification Search ............ 349/115, 349/98, 113–114, 106
See application file for complete search history.

(56) References Cited

U.S. PATENT DOCUMENTS

| 6,025,899 | A  | * | 2/2000  | Fukunaga et al. ........... 349/115 |
| 6,300,929 | B1 | * | 10/2001 | Hisatake et al. ............. 345/94  |
| 6,727,967 | B2 | * | 4/2004  | Nakamura et al. .......... 349/114 |
| 2001/0050739 | A1 | * | 12/2001 | Jung .......................... 349/115 |
| 2003/0210369 | A1 |   | 11/2003 | Wu |

(Continued)

FOREIGN PATENT DOCUMENTS

EP          1 267 198 A2    12/2002

(Continued)

OTHER PUBLICATIONS

U.S. Appl. No. 09/418,602.*

(Continued)

*Primary Examiner*—David Nelms
*Assistant Examiner*—(Nancy) Thanh-Nhan P. Nguyen
(74) *Attorney, Agent, or Firm*—Oliff & Berridge, PLC

(57) ABSTRACT

In view of the above problems of the prior art, the present invention has been made, and an object of the present invention is to provide a board, which is free from coloring, has high color tone quality, can realize a bright display screen, and imposes no significant restriction on the provision of an electric circuit, and a display device comprising the board, and further provides a liquid crystal display board, which is excellent in color contrast between transmission display and reflection display, and a semi-transmission color liquid crystal display device comprising the liquid crystal display board. A board according to the invention comprises a light transparent substrate and a cholesteric layer provided on the substrate and provided with an optical window of a predetermined pattern.

7 Claims, 10 Drawing Sheets

U.S. PATENT DOCUMENTS

2004/0145691 A1* 7/2004 Kubota et al. .............. 349/114
2005/0036086 A1* 2/2005 Kim et al. ................. 349/106

FOREIGN PATENT DOCUMENTS

| JP | 2000-162590 | 6/2000 |
|---|---|---|
| JP | 2000-193962 | 7/2000 |
| JP | 2000-275631 | 10/2000 |
| JP | 2002-207227 | 7/2002 |
| JP | 2002-267830 | 9/2002 |
| JP | 2002-365623 | 12/2002 |

OTHER PUBLICATIONS

Bass, M., "Handbook of Optics", vol. 1, Chapter 42, p. 42.3-42.6, Optical Properties of Films and Coatings, Optical Society of America, USA.

* cited by examiner

BOARD WITH CHOLESTERIC LAYER AND DISPLAY HAVING THE BOARD

TECHNICAL FIELD

The present invention relates to a semi-transmission liquid crystal display device and a board for use in the liquid crystal display device.

BACKGROUND ART

Liquid crystal display devices have been applied to various fields, for example, monitors of notebook or desktop personal computers, car navigation systems, scientific electronic calculators, small to medium television sets, and domestic electric appliances. Among others, reflection liquid crystal display devices do not require the use of any backlight. Therefore, the application of the reflection liquid crystal display devices to displays for portable equipment, such as mobile PCs, has been made utilizing features of the reflection liquid crystal display devices, i.e., low power consumption and small thickness/lightweight. In conventional reflection liquid crystal display devices, however, since external light is utilized for display, the display screen is dark when the environment, where the display device is used, is dark. In particular, in a dark place, the display screen is not viewable at all, and, thus, the display device cannot be used.

In order to overcome the above problem, a semi-transmission liquid crystal display device, for example, using as a reflecting plate a semi-transmission reflecting plate such as a half mirror, has been developed so that, in a dark environment, the display can be used as a transmission liquid crystal display device. Methods for half mirror formation are shown in FIGS. 1 and 2. In the method shown in FIG. 1, light semi-transmission metallic thin film formed by vacuum deposition or the like is disposed on the whole reflecting surface (hereinafter referred to as "metallic thin film method"). In the method shown in FIG. 2, a total reflection metallic plate part, which is a total reflection part provided as a reflecting electrode and formed of a metal such as aluminum, and a transparent part disposed as a transparent electrode are alternately provided, and the ratio of quantity of light between reflected light and transmitted light is regulated by varying the area ratio between the total reflection part and the transparent part (hereinafter referred to as "area division method"). Display devices utilizing a semi-transmission film formed by the metallic thin film method have been put to practical use in inexpensive game machines and the like. On the other hand, semi-transmission films formed by the area division method have been put to practical use in display devices, which are in many cases used outdoors, such as digital cameras and portable telephones (cellular phones).

Further, in these liquid crystal display devices, the provision of a color filter can realize color display. Display devices using a semi-transmission film formed by the metallic thin film method, however, suffer from a problem that the light utilization efficiency is less than 50% and the brightness of the display screen is much inferior to that of the transmission display device or the reflection display device.

Further, the use of the total reflection film formed of a metal formed by the area division method causes the so-called coloring phenomenon and thus disadvantageously deteriorates color tone quality of reflected light.

Furthermore, since the metallic thin film and the metallic plate are electrically conductive, the provision of an electric circuit in direct contact with the metallic thin film and the metallic plate is impossible. This imposes restriction on the design of the display device.

Furthermore, the conventional semi-transmission color liquid crystal display device as shown in FIG. 2 suffers from a problem of a difference in brightness of display between transmission display and reflection display due to a difference in length of path of light, which passes through the color filter, between transmission display and reflection display.

DISCLOSURE OF THE INVENTION

In view of the above problems of the prior art, the present invention has been made, and an object of the present invention is to provide a board, which is free from coloring, has high color tone quality, can realize a bright display screen, and imposes no significant restriction on the provision of an electric circuit, and a display device comprising the board, and further provides a liquid crystal display board, which is excellent in color contrast between transmission display and reflection display, and a semi-transmission color liquid crystal display device comprising the liquid crystal display board.

The present invention will now be described. In recent years, a film formed by forming a thin film of a cholesteric liquid crystal or a chiral nematic liquid crystal and polymerizing the film (the polymerized film being hereinafter referred to as "cholesteric layer") has become available. The cholesteric layer is stable physically, optically and chemically even upon exposure to a high temperature of about 210 to 240° C. in the production of a liquid crystal display cell. A reflecting layer formed of a cholesteric layer functions to selectively reflect only a counterclockwise or clockwise circularly polarized light component in light components incident to a main surface of the reflecting layer while transmitting the other component. Further, stacking cholesteric layers different from each other or one another in liquid crystal helical pitch can bring the wavelength band width of reflected light to a broadband and can realize the formation of the so-called coloring-free reflecting layer (hereinafter referred to as "white reflecting layer").

In a first embodiment of the present invention, the above object can be attained by a board comprising a light transparent substrate 3b and a cholesteric layer 9 provided on the substrate and provided with an optical window of a predetermined pattern.

The incorporation of the board according to the present invention in a liquid crystal display device can solve the problem of the coloring phenomenon involved in the use of a reflecting film formed of a metal and can realize the provision of high-quality white reflected light. Further, unlike the case where the metallic thin film is used as the semi-transmission material, light absorption does not substantially occur. Therefore, a reflecting layer having high light utilization efficiency can be realized.

In the above board, the reflectance of circularly polarized light from the cholesteric layer is preferably 90 to 100%. When the reflectance is high and in the above defined range, satisfactory reflection can be provided. Therefore, the light utilization efficiency can be enhanced.

In a second embodiment of the present invention, the above object can be attained by a semi-transmission liquid crystal display device D comprising the board in the first embodiment. The liquid crystal display device according to the present invention is free from a coloring phenomenon in reflected light and has high light utilization efficiency.

In a preferred embodiment of the present invention, an electric circuit may be provided on the light transparent substrate side of the cholesteric layer. According to this construction, since the cholesteric layer per se has an electrical insulating property, unlike the use of the metallic plate or the metallic thin film as the reflecting layer, there is no need to provide an insulating layer between the electric circuit and the cholesteric layer. Therefore, the construction of the liquid crystal display device can be simplified, and the number of elements necessary for the construction can be reduced. At the same time, the degree of freedom in design can be enhanced.

In a third embodiment of the present invention, there is provided a liquid crystal display device comprising a first color filter layer provided on the upper part of or above the cholesteric layer and a second color filter layer provided on the upper part of or above the optical window portion.

The second color filter layer is preferably provided in the optical window portion in the cholesteric layer. By virtue of the provision of the color filter layers in this manner, the color tone of light passed through the color filter layer at the time of transmission and the color tone of light passed through the color filter layer at the time of reflection can be regulated.

Alternatively, the color tone at the time of transmission display and the color tone at the time of reflection display may be regulated by providing color filter layers on the upper part of or above the cholesteric layer and making the light transmittance of the color filter layer in its portion corresponding to the optical window portion higher than the light transmittance of the color filter layer in its optical window-free portion.

The above functions and advantages of the present invention will be apparent from the following detailed description.

BEST MODE FOR CARRYING OUT THE INVENTION

Embodiments of the present invention will be described with reference to the accompanying drawings. A display device provided with the board according to the present invention can be constructed, for example, as a semi-transmission liquid crystal display device. In the following embodiments, an example of the application of the present invention to a semi-transmission liquid crystal display device will be described.

A method for forming a broadband reflection-type cholesteric layer constituting a white reflecting layer on a substrate will be first described. A method for forming a pattern having a predetermined ratio between the area of the cholesteric layer and the area of the transparent layer on the substrate will be then described. Thereafter, the construction and the like of a semi-transmission liquid crystal display device provided with a cholesteric layer as a white reflecting layer will be described.

<Method for Broadband Reflection-type Cholesteric Layer (White Reflecting Layer) Formation>

A reflecting layer constituted by a cholesteric layer selectively reflects a counterclockwise circularly polarized light component or a clockwise circularly polarized light component in incident light, which arrives at a main surface of the reflecting layer, and transmits the remaining components. The polarized light component to be selectively reflected can be substantially entirely reflected by maintaining the thickness of the reflecting layer at a predetermined value or larger. Further, the so-called coloring-free white reflecting layer can be formed by stacking liquid crystal layers with different helical pitches to bring the wavelength bandwidth of the reflected light to a broadband. These are disclosed in detail by the present inventors in Japanese Patent Laid-Open No. 4843/2001.

Figure 1:
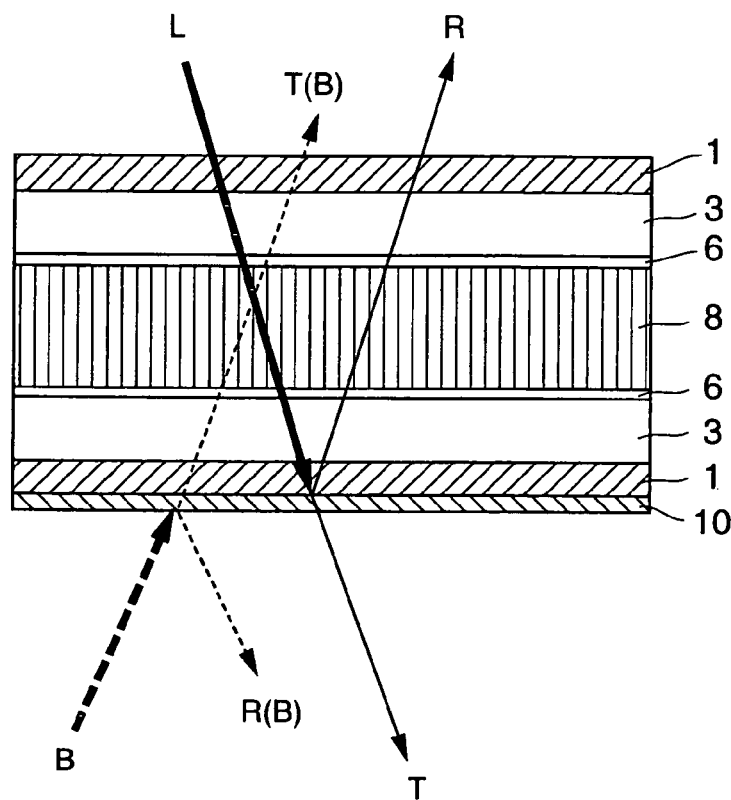
FIG. 1 is a cross-sectional view of a metallic thin film-type semi-transmission liquid crystal display device, wherein numeral 1 designates a polarizing plate, numeral 3 a glass substrate, numeral 6 a transparent electrode, numeral 8 a liquid crystal layer, numeral 10 a metallic thin film (a half mirror), and L designates incident light, R reflected light, B backlight, and T transmitted light.
Figure 2:
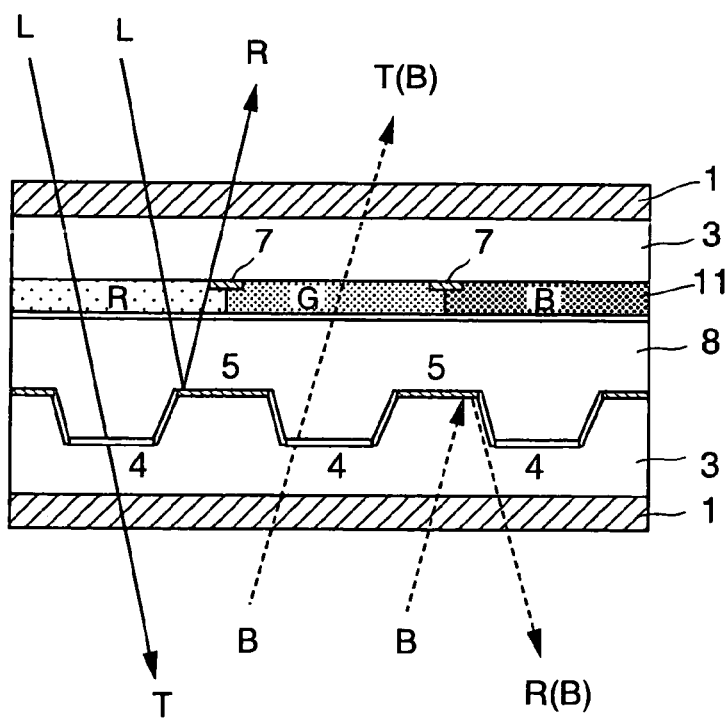
FIG. 2 is a cross-sectional view of an area division-type semi-transmission liquid crystal display device, wherein numeral 5 designates a reflecting electrode, numeral 7 a black stripe, and numeral 11 a color filter layer.
Figure 3:
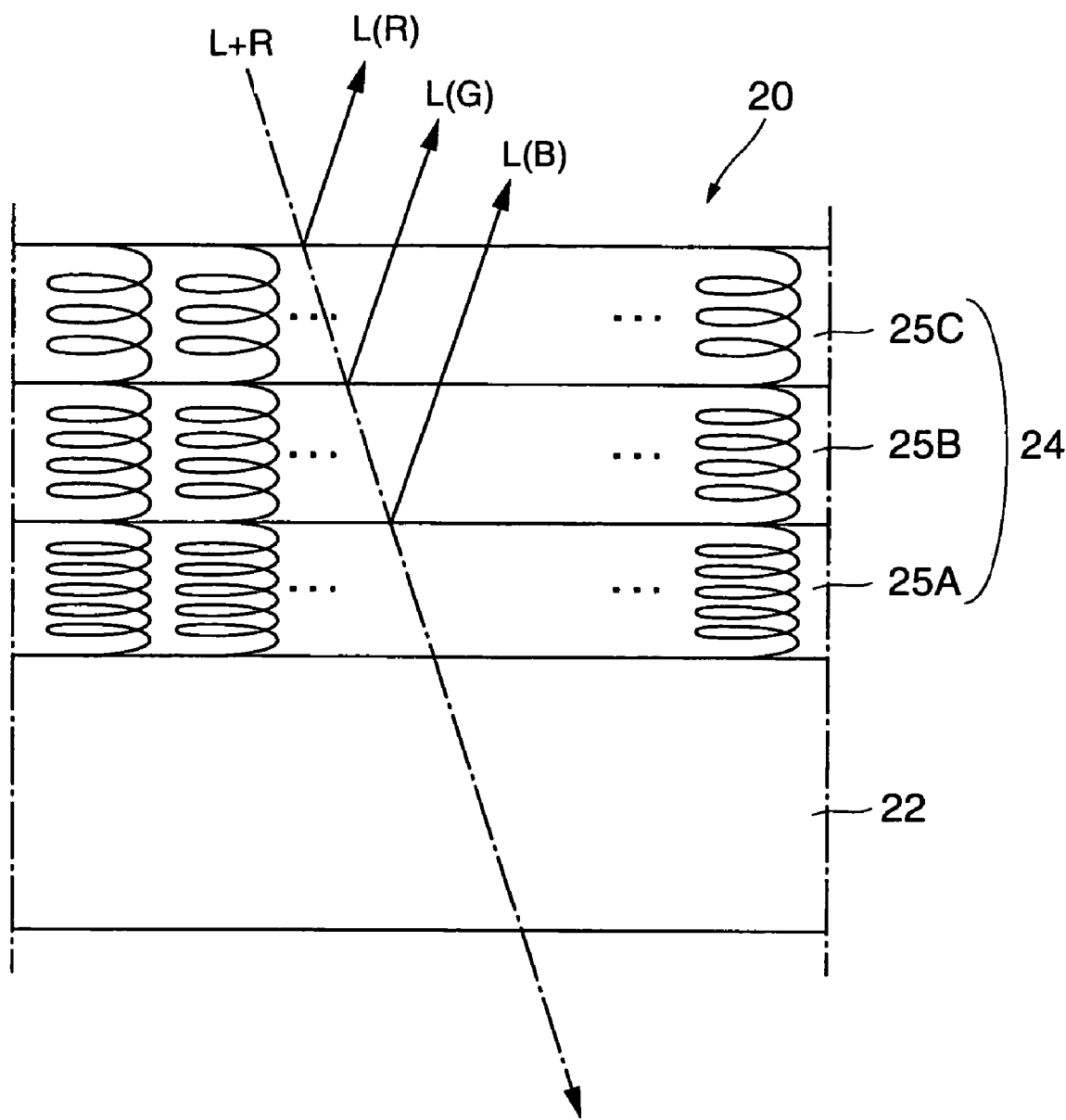
FIG. 3 is a schematic cross-sectional view of the structure of a cholesteric layer, wherein L+R designates natural light, L (R) reflected light with a red wavelength band of a counterclockwise circularly polarized light component, L (G) reflected light with a green wavelength band of a counterclockwise circularly polarized light component, and L (B) reflected light with a blue wavelength band of a counterclockwise circularly polarized light component, and numeral 20 designates a white reflecting layer, numeral 22 a light transparent substrate, numeral 24 a laminate, and numerals 25A to 25C cholesteric layers as liquid crystal layers corresponding to respective wavelength bands.

As shown in FIG. 3, a white reflecting layer 20, which is an example of an embodiment of the present invention comprises a light transparent substrate 22 and a laminate 24 provided on the light transparent substrate 22. The construction of the laminate 24 is such that a plurality of liquid crystal layers 25A, 25B, 25C . . . having cholesteric regularity, for example, cholesteric liquid crystal (including chiral nematic liquid crystal) have been stacked on top of one another so that the liquid crystal layers are identical to one another in the direction of rotation of liquid crystal molecules and the helical axes of molecules cross the liquid crystal layers in their thickness-wise direction. The liquid crystal layers 25A, 25B, 25C . . . are different from one another in distance per pitch (helical pitch) of the molecular helix. Further, the thickness of each of the liquid crystal layers 25A, 25B, 25C . . . is larger than the thickness necessary for reflecting either a dextrorotatory circularly polarized light component or a levorotatory circularly polarized light component of incident corresponding wavelength light with the maximum reflectance. The laminate 24 reflects one of the dextrorotatory circularly polarized light component and the levorotatory circularly polarized light component with the maximum reflectance and transmits the other circularly polarized light component.

Figure 4:
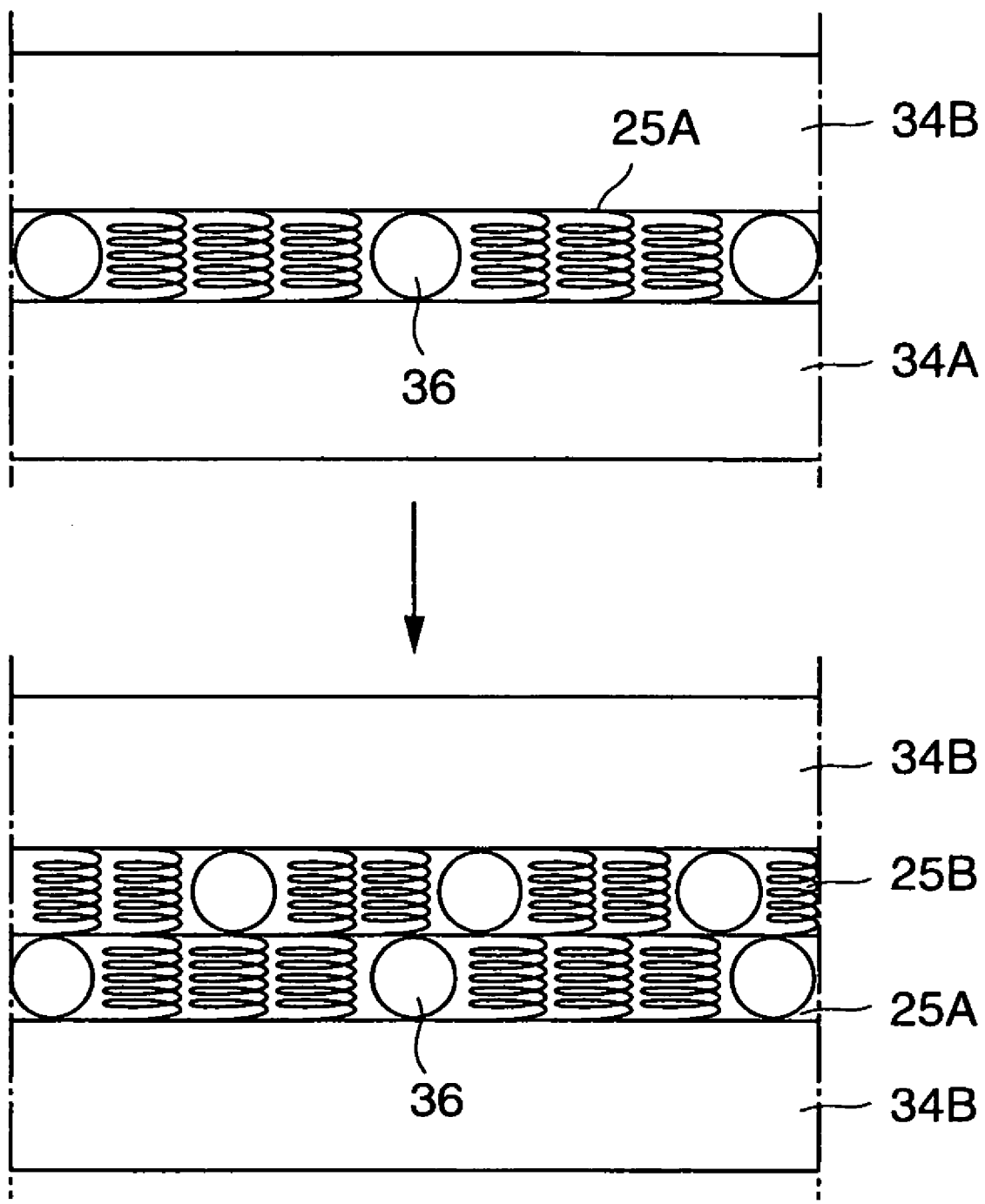
FIG. 4 is a schematic cross-sectional view of a formation process of a cholesteric layer.

The step of forming the liquid crystal layers 25A, 25B, 25C . . . will be described with reference to FIG. 4. In a method for carrying out the step of forming the liquid crystal layers shown in FIG. 4, beads 36 having a diameter equal to the contemplated thickness of the liquid crystal layer are previously dispersed as a spacer in a cholesteric liquid crystal or a chiral nematic liquid crystal, and the dispersion is then poured into between a pair of substrates 34A, 34B. According to this method, the gap between the substrates 34A, 34B can be made to a contemplated size. A light transparent substrate 22 may be used instead of the substrate 34A. An aligning film formed of a polyimide film or the like (not shown) is previously formed on the surface of at least one of the substrates 34A, 34B in its liquid crystal side. A radiation-curable liquid crystal, such as a photopolymerizable liquid crystal having cholesteric regularity, or a liquid crystal polymer having cholesteric regularity kept at a high temperature is poured into the gap between the substrates 34A, 34B to form an uncured cholesteric liquid crystal layer. This permits the molecular helical axis of the liquid crystal poured into between the substrates 34A, 34B to be aligned so as to cross the liquid crystal layer in its thickness-wise direction. Regarding means for aligning liquid crystal molecules, stretched PET may be used instead of the aligning film.

Materials for the cholesteric liquid crystal layer include polymerizable monomer molecules, polymerizable oligomer molecules, and liquid crystal polymers.

When polymerizable monomer molecules or polymerizable oligomer molecules are used as the material for the cholesteric liquid crystal layer, the aligned liquid crystal molecules are three-dimensionally crosslinked to give a polymer, thereby forming a cholesteric layer. Three-dimensional crosslinking can be achieved, for example, by adding a photopolymerization initiator to the liquid crystal molecules and applying ultraviolet light to cure the liquid crystal. Alternatively, a method may be adopted wherein electron beams are directly applied to cure the liquid crystal. After the liquid crystal molecules are three-dimensionally crosslinked for curing, one of the substrates is removed while leaving the aligning film on the remaining substrate or removing the aligning film together with the substrate to be removed. Thus, the formation of a liquid crystal layer 25A as a first layer is completed.

On the other hand, when a liquid crystal polymer is used as the material for the cholesteric layer, the aligned liquid crystal polymer is cooled to bring the polymer to a glassy state, thereby forming a cholesteric layer. After the formation of the cholesteric layer, one of the substrates is removed while leaving the aligning film on the remaining substrate or removing the aligning film together with the substrate to be removed. Thus, the formation of a liquid crystal layer 25A as a first layer is completed.

The second liquid crystal layer 25B is formed in the same manner as used in the formation of the first liquid crystal layer 25A, except that the cured liquid crystal layer 25A is used as one of the substrates. The above procedure is repeated a predetermined number of times to stack all of the liquid crystal layers 25A, 25B, 25C . . . on top of one another, thereby completing the formation of the laminate 24. According to this method, the cholesteric liquid crystal state can be optically anchored or immobilized to form a cholesteric layer as a film which is easy to handle as an optical film and is stable at room temperature. Further, stacking a large number of cholesteric layers different from each other or one another in helical pitch can provide a coloring-free cholesteric layer (a white reflecting layer).

In order to align liquid crystal molecules, a method may be adopted wherein polymerizable monomer molecules or polymerizable oligomer molecules or a liquid crystal polymer are dissolved in a solvent to prepare a coating liquid which is then coated onto an aligning film on the substrate. In this case, three-dimensional crosslinking or the step of drying before cooling should be carried out.

<Patterning on Substrate>

Figure 5:
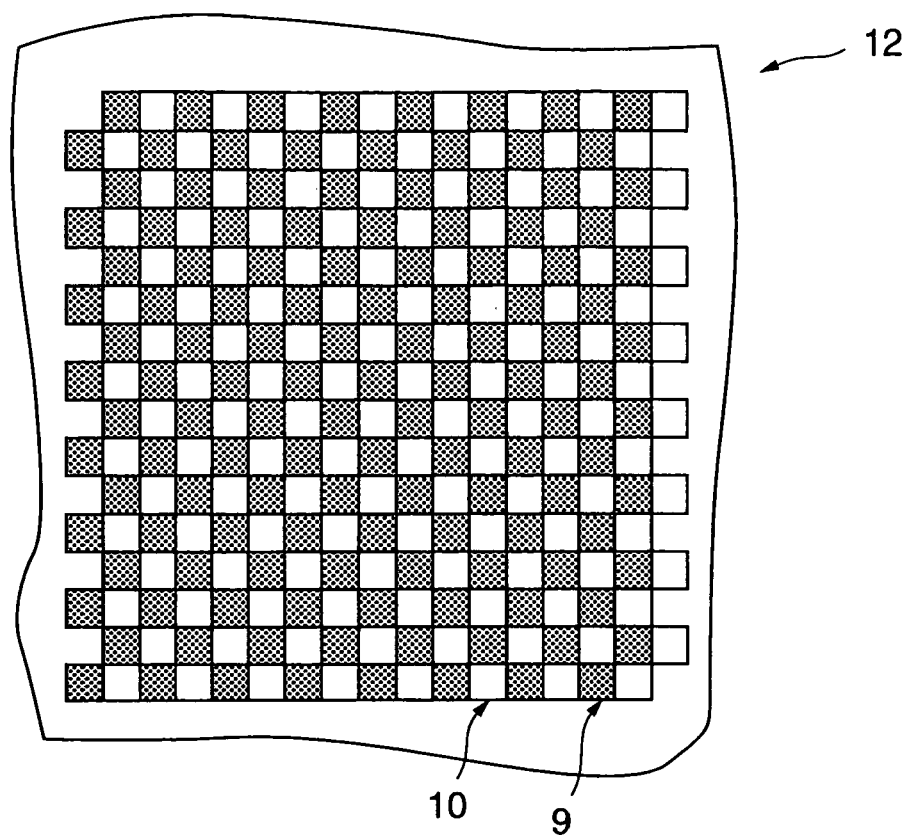
FIG. 5 is a plan view of an embodiment of an array of white reflecting layers and transparent layers on a substrate, wherein numeral 9 designates a white reflecting layer, numeral 10 a transparent layer, and numeral 12 a substrate.

In the construction of a semi-transmission liquid crystal display device using the white reflecting layer formed as described above, for example, as shown in FIG. 5, the white reflecting layer and a transparent layer should be alternately disposed on a main surface side of a light transparent substrate 22 (generally formed of a glass substrate) to form a pattern having a predetermined area ratio of the white reflecting layer to the transparent layer. Methods for pattern formation may be classified into a laser method (see Japanese Patent Application Nos. 100975/2001 and 101004/2001) and a solvent method (see Japanese Patent Application No. 317965/2001) which will be briefly described later.

<Laser Method>

In the laser method, a laser beam containing, as a main component, a circularly polarized light component of which the direction of optical rotation is opposite to the direction of rotation of light selectively reflected from the cholesteric layer, or a laser beam with a wavelength outside the selective reflection wavelength band of the cholesteric layer is applied to the cholesteric layer to remove a part of the cholesteric layer by evaporation and thus to pattern the cholesteric layer. The laser beam used herein preferably has a shorter wavelength than visible light. In the cholesteric layer patterned by the laser beam, due to exposure to heat of the laser beam, the crosslinking density of a portion around the removed portion in the cholesteric layer is higher than that of the other portion remaining unremoved. Further, the cholesteric layer on its laser beam incident side is removed in a larger amount than the cholesteric layer on its front end side. Therefore, the area of the cholesteric layer in contact with the glass substrate is larger than the area of the surface of the cholesteric layer. Therefore, the cholesteric layer is less likely to be separated from the glass substrate.

<Solvent Method>

The solvent method can be applied to the case where polymerizable monomer molecules or polymerizable oligomer molecules are used as the material for the cholesteric layer. Ultraviolet light or the like is applied selectively to the layer only in its portion, which should constitute the white reflecting layer, specifically through exposure using a mask, while avoiding the application of the radiation to the portion where the transparent layer is to be formed. Specifically, the ultraviolet light or the like is applied so that three-dimensional crosslinking does not take place in the transparent layer portion while three-dimensional crosslinking takes place in the other portion. The cholesteric layer is then immersed in a solvent such as acetone. This causes the polymerizable monomer molecules or the polymerizable oligomer molecules in a portion, which has not three-dimensionally crosslinked, to be eluted in the solvent. As a result, the layer in this portion is removed, and the substrate in its portion corresponding to the transparent layer is exposed. Thus, a white reflecting layer can be formed in a desired pattern on the substrate.

<Construction of Display Device>

An example of a semi-transmission liquid crystal display device in an embodiment of the present invention will be described with reference to FIG. 6. A semi-transmission liquid crystal display device D comprises a front-side circularly polarizing plate 1f, a front-side glass substrate 3f, a black stripe 7, and a color filter layer 11. The front-side circularly polarizing plate comprises a combination of a linearly polarizing plate with a λ/4 phase difference plate 2f as a fixed retarder layer and functions to convert natural light to clockwise circularly polarized light.

An ITO layer 6 is provided as a transparent electrode behind the color filter layer 11. Further, a liquid crystal layer 8 is provided behind the ITO layer. An aligning film (not shown) is provided on the liquid crystal layer side of ITO. The liquid crystal layer is constructed as a vertical alignment-type liquid crystal layer.

A portion where a cholesteric layer 9 as a white reflecting layer is provided and a portion where the cholesteric layer 9 as the white reflecting layer is not provided are alternately disposed on the backside glass substrate in its liquid crystal layer side. In the portion where the cholesteric layer is provided, an ITO layer is disposed between the cholesteric layer and the liquid crystal layer. Further, an aligning film (not shown) is provided on the liquid crystal layer side of ITO.

In the portion where the cholesteric layer is not provided, an ITO layer is provided directly on the glass substrate, an aligning film (not shown) is provided on the liquid crystal layer side of ITO, and the upper surface of the aligning film is in contact with the liquid crystal layer. For example, an element for driving the liquid crystal, such as TFT 17 or TFD, is provided within the cholesteric layer. In this construction, since TFT and TFD are insulated by the cholesteric layer, there is no need to provide an insulating layer around TFT and TFD.

A conductive layer (not shown) is provided on the glass substrate so as to be in contact with the cholesteric layer. The conductive layer supplies electricity to TFT and TFD and performs, for example, continuity to the ITO layer and the like. Further, a backside circularly polarizing plate 1b is disposed behind the backside glass substrate. The backside circularly polarizing plate comprises a combination of a linear polarizing plate with a λ/4 phase difference plate 2b as a fixed retarder layer and functions to convert natural light to counterclockwise circularly polarized light.

Backlight is provided behind the backside circularly polarizing plate. Further, a diffuse reflecting layer is provided behind the backlight.

Figure 6:
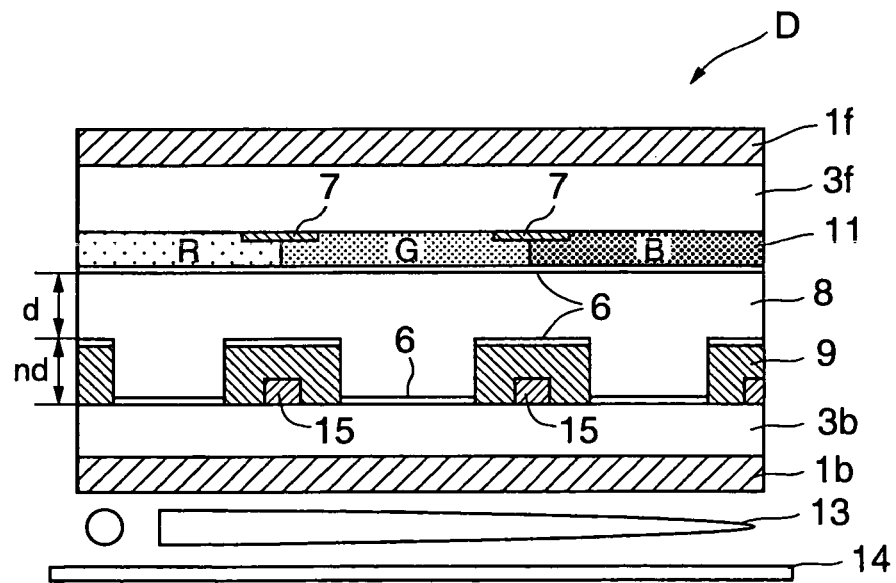
FIG. 6 is a cross-sectional view of an embodiment of a semi-transmission liquid crystal display device using a cholesteric layer as a reflecting layer, wherein D designates a semi-transmission liquid crystal display device, numeral 1*f* a front-side circularly polarizing plate, numeral 1*b* a backside circularly polarizing plate, numeral 3*f* a front-side glass substrate, numeral 3*b* a backside glass substrate, numeral 6 a transparent electrode (ITO), numeral 16 a diffuse reflecting plate, and numeral 17 TFT.

When $$d=\lambda/2,$$

as shown in FIG. 6 on its left side, the liquid crystal layer and the cholesteric layer are provided so that the thickness of the liquid crystal layer defined as a distance between the upper surface of the liquid crystal layer and the upper surface of the cholesteric layer is d and the thickness of the cholesteric layer is nd. Here n is a positive integer (1, 2, 3, . . . ). According to this construction, conversion to circularly polarized light by the liquid crystal layer as a variable retarder layer is carried out as follows.

(Optical Function)

Figure 7:
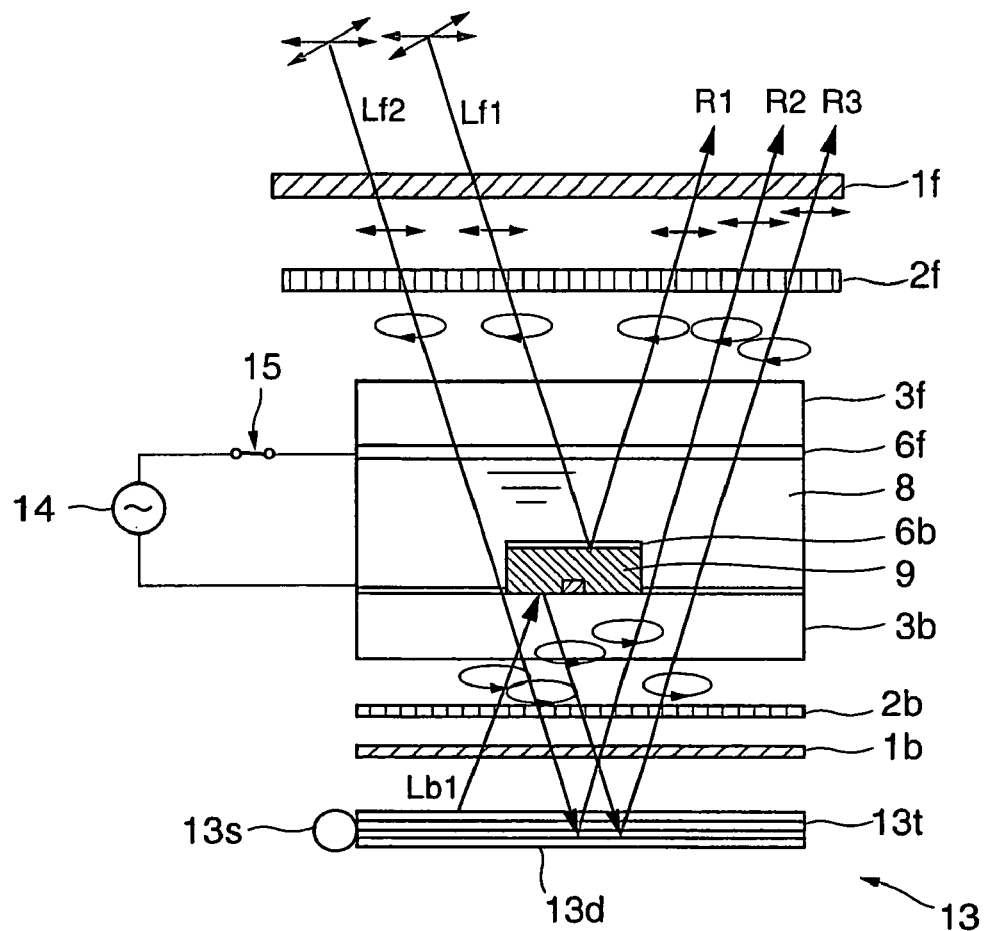
FIG. 7 is a typical diagram of an optical construction of the liquid crystal display device D shown in FIG. 6 in such a state that a liquid crystal drive power supply is in "ON," wherein numeral 6*f* designates a front-side transparent electrode, numeral 6*b* a backside transparent electrode, numeral 14 a power supply, and numeral 15 a switch. R1 to R3 designate reflected light.
Figure 8:
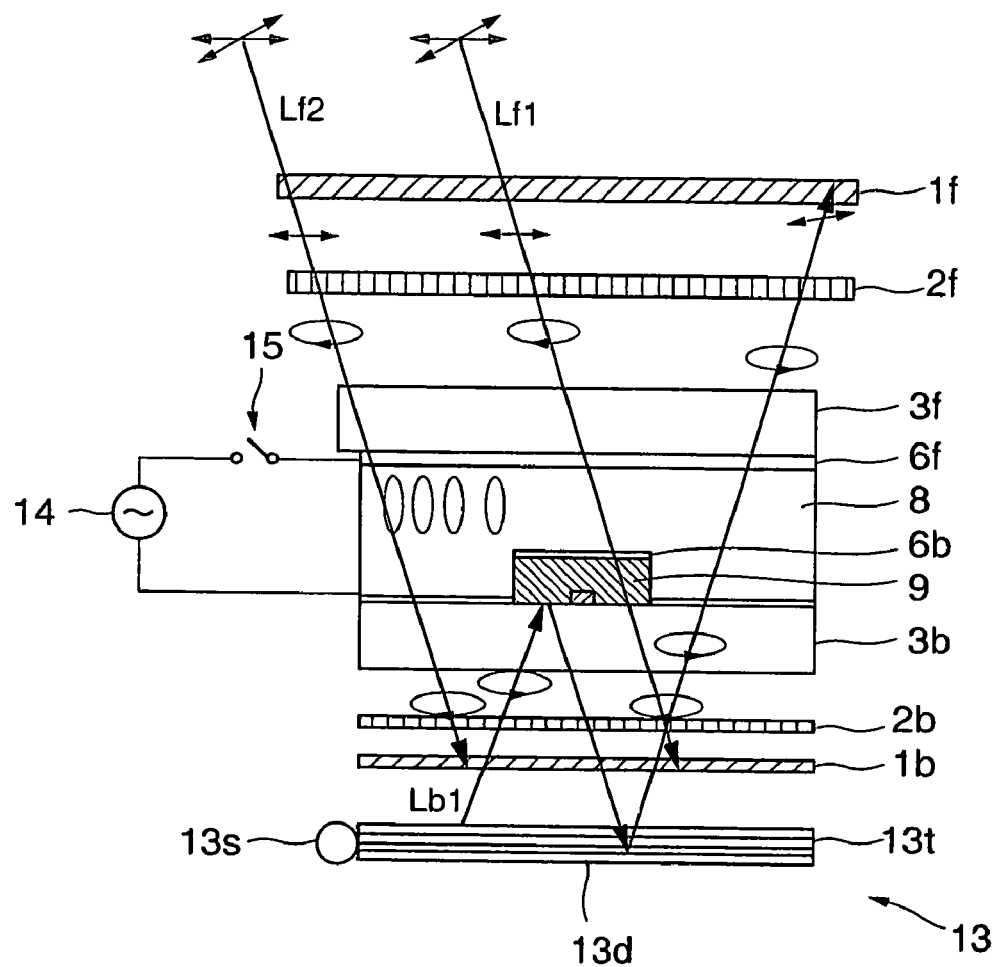
FIG. 8 is a typical diagram of an optical construction of the liquid crystal display device D shown in FIG. 6 in such a state that a liquid crystal drive power supply is in "OFF"

The optical function of the liquid crystal display device D having the above construction will be described with reference to FIGS. 7 and 8. FIGS. 7 and 8 are typical diagrams showing constituent elements extracted from the liquid crystal display device D shown in FIG. 6 and newly added constituent elements which are necessary for illustrating the optical function of the liquid crystal display device D.

FIG. 7 is a typical diagram of an optical construction of the liquid crystal display device D shown in FIG. 6 in such a state that a switch 15 of a liquid crystal drive circuit is closed and voltage is applied from a power supply 14 to the vertical alignment-type liquid crystal layer 8, that is, the liquid crystal drive circuit is in "ON," more strictly speaking, a voltage above the threshold value of the liquid crystal is applied. In this case, the vertical alignment-type liquid crystal molecules are subjected to homogeneous alignment in which the liquid crystal molecules are aligned from the upper side toward the lower side of the drawing in a direction horizontal to the substrate. In this state, natural light (external light) $L_n$ introduced from the viewer side which is located in the upper part of the drawing is incident as clockwise circularly polarized light to the vertical alignment-type liquid crystal layer 8 through the front-side polarizing plate 1f and the λ/4 phase difference plate 2f as the front-side fixed retarder layer. In the vertical alignment-type liquid crystal layer 8, the phase is delayed by λ/2. As a result, the light is converted to counterclockwise circularly polarized light which arrives at the cholesteric layer 9 as a white reflecting layer. The counterclockwise circularly polarized light, which has arrived at the cholesteric layer 9 is reflected from the cholesteric layer 9 and is again incident as the counterclockwise circularly polarized light to the vertical alignment-type liquid crystal layer 8. In the vertical alignment-type liquid crystal layer 8, the phase is again delayed by λ/2. As a result, the light is converted to clockwise circularly polarized light and exits the vertical alignment-type liquid crystal layer 8. This light is again passed through the λ/4 phase difference plate 2f as the front-side fixed retarder layer and consequently is converted to linearly polarized light along the polarizing axis of the front-side polarizing plate 1f and is passed through and exits, as light R1, the front-side polarizing plate 1f. As a result, bright display can be provided by the light R1.

On the other hand, natural light (external light) $L_{f2}$, which is introduced from the viewer side, which is located in the upper part of the drawing, and is incident to the transparent layer adjacent to the white reflecting layer 9, as with $L_{f1}$, is incident as clockwise circularly polarized light to the vertical alignment-type liquid crystal layer 8 through the front-side polarizing plate 1f and the λ/4 phase difference plate 2f as the front-side fixed retarder layer. In the vertical alignment-type liquid crystal layer 8, the phase is delayed by λ/2. As a result, the light is converted to clockwise or counterclockwise circularly polarized light which is transmitted through the backside glass substrate 3b and arrives at the λ/4 phase difference plate 2b as the backside fixed retarder layer.

Upon passage through the λ/4 phase difference plate 2b as the backside fixed retarder layer, the light is converted to linearly polarized light along the polarizing axis of the backside polarizing plate 1b. The light is passed through the backside polarizing plate 1b and is reflected from the diffuse reflection layer 13d and consequently is converted to upward light. The light is again passed through the backside polarizing plate 1b and the backside fixed retarder layer 2b and consequently is converted to counterclockwise circularly polarized light. While retaining the counterclockwise property, the light is passed through the vertical alignment-type liquid crystal layer 8, the front-side glass substrate 3f, etc. and is again passed through the λ/4 phase difference plate 2f as the front-side fixed retarder layer and consequently is converted to linearly polarized light along the polarizing axis of the front-side polarizing plate 1f and is passed through and exits, as light R2, the front-side polarizing plate 1f. As a result, bright display can be provided by the light R2.

FIG. 8 is a typical diagram of an optical construction of the liquid crystal display device D shown in FIG. 6 in such a state that the switch 15 of the liquid crystal drive circuit is open and a voltage below the threshold value is applied to the vertical alignment-type liquid crystal layer 8, that is, the liquid crystal drive circuit is in "OFF." In this case, the vertical alignment-type liquid crystal layer 8 is in such a state that liquid crystal molecules are aligned perpendicularly to the substrate and, consequently, incident light does not undergo phase modulation. In this state, as with the case described above in connection with FIG. 7, natural light (external light) $L_{f1}$ introduced from the viewer side which is located in the upper part of the drawing is incident as clockwise circularly polarized light to the vertical alignment-type liquid crystal layer 8 through the front-side polarizing plate 1f and the λ/4 phase difference plate 2f as the front-side fixed retarder layer. In the vertical alignment-type liquid crystal layer 8, however, since liquid crystal molecules are aligned perpendicularly to the substrate, the incident clockwise circularly polarized light does not undergo phase modulation and as such arrives at the cholesteric layer 9. The molecules constituting the cholesteric layer 9 are permeable to the clockwise circularly polarized light, and the clockwise circularly polarized light is transmitted toward the backside of the display device D. The light is converted by the backside phase difference plate 2b to linearly polarized light containing a vibrating component along the absorption axis of the backside polarizing plate 1b and is absorbed in the backside polarizing plate 1b. As a result, the light is not returned to the viewer side, and dark display is provided.

On the other hand, natural light (external light) $L_{f2}$, which is introduced from the viewer side, which is located in the upper part of the drawing, and is incident to the transparent layer adjacent to the white reflecting layer 9, as with $L_{f1}$, is incident as clockwise circularly polarized light to the vertical alignment-type liquid crystal layer 8 through the front-side polarizing plate 1f and the λ/4 phase difference plate 2f as the front-side fixed retarder layer. In the vertical alignment-type liquid crystal layer 8, the phase is not delayed, and the clockwise circularly polarized light as such is transmitted through the backside glass substrate 3b and arrives at the λ/4 phase difference plate 2b as the backside fixed retarder layer. The light is converted by the backside phase difference plate 2b to linearly polarized light containing a vibrating component along the absorption axis of the backside polarizing plate 1b and is absorbed in the backside polarizing plate 1b. As a result, the light is not returned to the viewer side, and, here again, dark display is provided.

Next, the operation of an embodiment, wherein backlight 13 is disposed as a surface light source on the backside of the cholesteric layer 9, will be described again with reference to FIGS. 7 and 8. The backlight 13 comprises a light guide plate 13t formed of a transparent flat plate, a linear light source 13s disposed on the side face of the light guide plate 13t, and a diffuse reflection layer 13d disposed on the backside of the light guide plate 13t.

In the state shown in FIG. 7, that is, in such a state that the switch 15 of the liquid crystal drive circuit is closed and voltage is applied from the power supply 14 to the vertical alignment-type liquid crystal layer 8, that is, the liquid crystal drive circuit is in "ON," light $L_{b1}$ output from the backlight 13 is converted by the backside polarizing plate 1b and the backside phase difference plate 2b to counterclockwise circularly polarized light which is then reflected from the lower surface of the cholesteric layer 9. The molecules constituting the cholesteric layer 9 reflect counterclockwise circularly polarized light and are permeable to clockwise circularly polarized light.

The light reflected from the lower surface of the cholesteric layer 9 is counterclockwise circularly polarized light and thus is transmitted through the backside retarder layer 2b and the backside polarizing plate 1b. The light is then reflected from the diffuse reflection layer 13d and is again passed through the backside polarizing plate 1b and the backside phase difference plate 2b where the light is again converted to counterclockwise circularly polarized light and arrives at the cholesteric layer 9 or the transparent layer.

The counterclockwise circularly polarized light, which has arrived at the cholesteric layer 9, is again reflected from the lower surface of the cholesteric layer 9, and the above function is repeated. On the other hand, for the light incident to the transparent layer, the phase is delayed by λ/2 by the vertical alignment-type liquid crystal layer 8. As a result, the light is converted to clockwise circularly polarized light and exits the vertical alignment-type liquid crystal layer 8. This light is passed through the λ/4 phase difference plate 2f as the front-side fixed retarder layer and consequently is converted to linearly polarized light along the polarizing axis of the front-side polarizing plate 1f and is passed through and exits, as light R3, the front-side polarizing plate 1f. As a result, bright display can be provided by the light R3. Therefore, the light of the backlight is satisfactorily effectively utilized, and bright display can be realized.

On the other hand, in the state shown in FIG. 8, that is, in such a state that the switch 15 of the liquid crystal drive circuit is open and a voltage below the threshold value is applied to the vertical alignment-type liquid crystal layer 8, that is, the liquid crystal drive circuit is in "OFF," light output from the backlight 13 is reflected from the lower surface of the cholesteric layer 9. The light reflected from the lower surface of the cholesteric layer 9 is counterclockwise circularly polarized light and thus is transmitted through the backside retarder layer 2b and the backside polarizing plate 1b. The light is then reflected from the diffuse reflection layer 13d and is again passed through the backside polarizing plate 1b and the backside phase difference plate 2b where the light is again converted to counterclockwise circularly polarized light and arrives at the cholesteric layer 9 or the transparent layer.

The counterclockwise circularly polarized light, which has arrived at the cholesteric layer 9, is again reflected from the lower surface of the cholesteric layer 9, and the above function is repeated. The light incident to the transparent layer is then passed through the vertical alignment-type liquid crystal layer 8. Here the light does not undergo the delay of the phase and, while retaining the counterclockwise property, is incident to the front-side phase difference plate 2f. In the front-side phase difference plate 2f, the light is converted to linearly-polarized light containing a vibrating component along the absorption axis of the front-side polarizing plate 1f and is absorbed in the front-side polarizing plate 1f. As a result, the light is not returned to the viewer side, and dark display is provided.

Thus, in the display device having an identical structure, both when external light is utilized and when backlight is utilized, recycling of light can provide display with very high light utilization efficiency and thus can realize bright display.

A semi-transmission liquid crystal display device can be constructed by alternately arranging a white reflecting layer, formed of a cholesteric layer, and a transparent layer. Further, a semi-transmission liquid crystal display device having any desired transmittance (reflectance) can be provided by varying the ratio of the area of the white reflecting layer to the area of the transparent layer.

Figure 9:
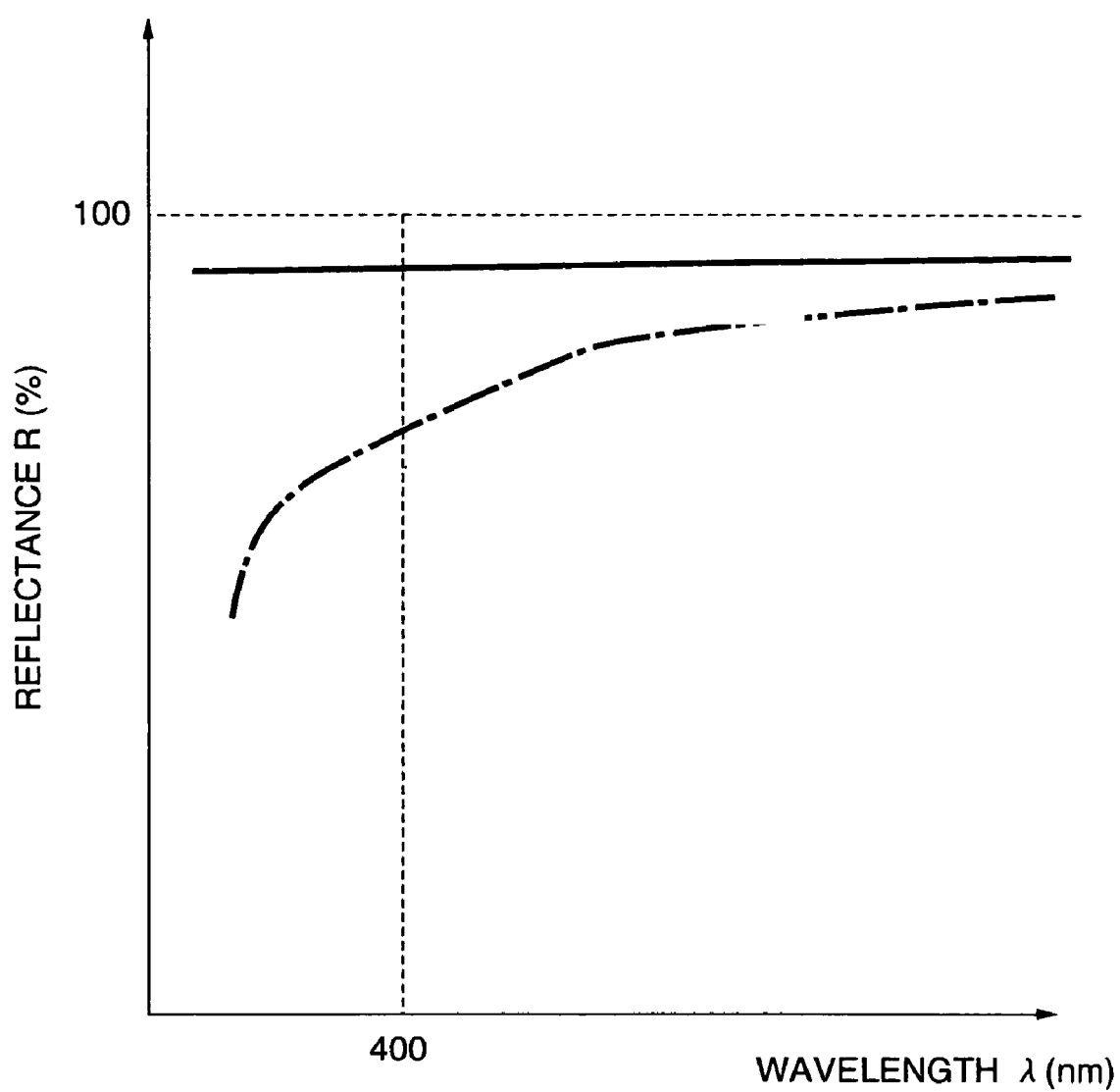
FIG. 9 is a diagram showing the reflectance of light with wavelengths in a near-visible light region from a cholesteric layer in comparison with the reflectance of the light with wavelengths in a near-visible light region from a metal plate, wherein the solid line represents the reflectance of the light from the cholesteric layer (white reflecting layer) and the dotted line the reflectance of the light from the metallic reflecting plate.

In the semi-transmission liquid crystal display device having the above construction, as compared with the conventional semi-transmission liquid crystal display device provided with a metallic reflecting plate, the color tone of display colors can be improved. FIG. 9 is a diagram showing the reflectance of light from a cholesteric layer (white reflecting layer) in comparison with the reflectance of light from a metallic plate in a wavelength region around visible light. The reflectance R (%) is plotted as ordinate against the wavelength λ (nm) of reflected light as abscissa to compare the reflection of light from the white reflecting layer with the reflection of light from the metallic plate. As is apparent from the drawing, in the case of reflection of light from the metallic plate, the reflectance gradually decreases at a wavelength around 400 nm and lower wavelengths. This is causative of the so-called coloring phenomenon which, when a metallic reflecting plate is used, is observed as yellowish reflected light. By contrast, in the case of the white reflecting layer formed of the cholesteric layer, the reflectance is high on average in each wavelength region, and a lowering in reflectance experienced in the case of the metallic plate, which begins at a wavelength around 400 nm, does not occur. Therefore, high reflectance over all the wavelength regions and reflection free from any coloring phenomenon can be realized.

Figure 10:
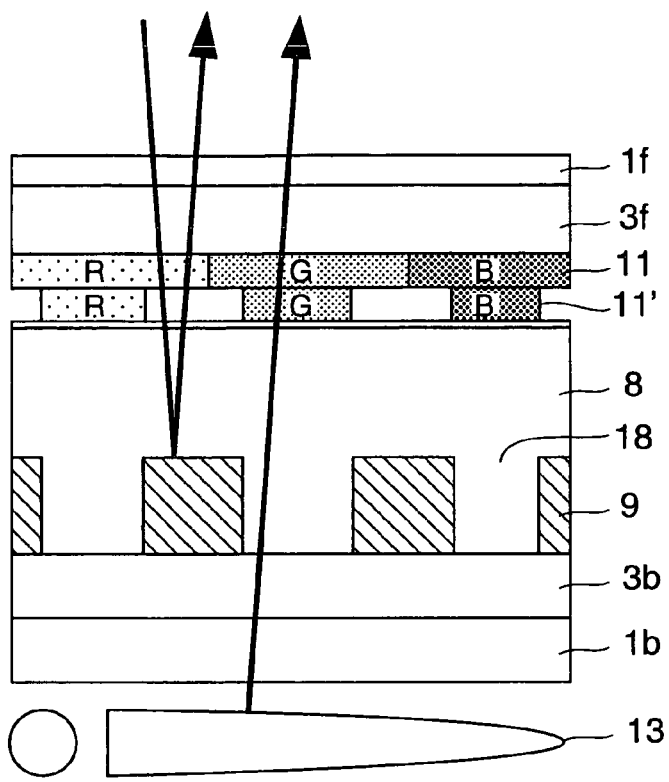
FIG. 10 is a schematic cross-sectional view of an example of a semi-transmission liquid crystal display device in another embodiment of the present invention, wherein numeral 11 designates a first color filter layer, numeral 11' a second color filter layer, and numeral 18 an optical window.

Next, a liquid crystal display device, which is excellent in color contrast between transmission display and reflection display, will be described as another embodiment of the present invention. FIG. 10 shows a liquid crystal display device which has been constructed so that the display color tone in the transmission display is equal to the display color tone in the reflection display by regulating the optical path length of light passed through the color filter layer in the reflection display and the optical path length of light passed through the color filter layer in the transmission display.

Figure 11:
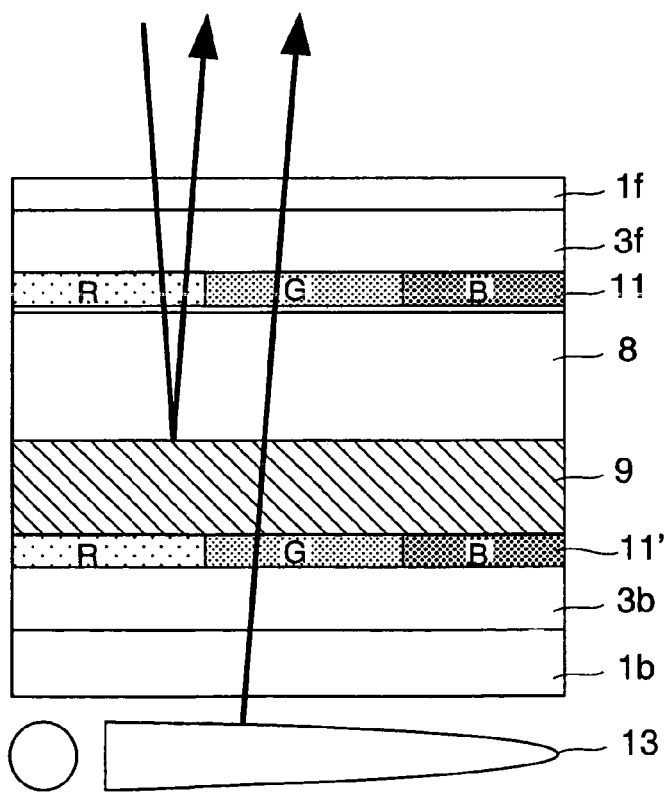
FIG. 11 is a schematic cross-sectional view of an example of a semi-transmission liquid crystal display device in still another embodiment of the present invention, wherein numeral 11 designates a color filter layer for a deep color and numeral 11' a color filter layer for a light color.

In the case of display using natural light (hereinafter referred to as "reflection display"), as described above, light is transmitted through a first color filter layer 11, is reflected from a cholesteric layer, and is again transmitted through and exits the first color filter layer. On the other hand, in the case of display using backlight (hereinafter referred to as "transmission display"), light from the light source is transmitted through the transparent layer, which is a portion provided with an optical window in the cholesteric layer, is passed through a second color filter layer 11', and is then passed through the first color filter layer 11. The thickness of the second color filter layer is regulated so that the optical path length, in the case where the light goes through the first color filter layer and is then returned through the first color filer, is equal to the optical path length of light which is passed through the first and second color filter layers. As a result, the light transmittance in the transmission display is equal to the light transmittance in the reflection display, and an excellent display device free from uneven display color tone can be realized. In this connection, it is a matter of course that the semi-transmission liquid crystal display device according to the present invention can be applied to a semi-transmission liquid crystal display device, other than the area division-type semi-transmission liquid crystal display device, as shown in FIG. 11. Specifically, even in a semi-transmission liquid crystal display device using a light transparent board provided with a cholesteric layer free from an optical window having a predetermined pattern, the difference in display color tone between the transmission display and the reflection display can be eliminated by providing a first color filter layer 11 above the cholesteric layer and providing a second color filter layer 11' on the lower part of the cholesteric layer. Also in this case, the display device has excellent display contrast.

Figure 12:
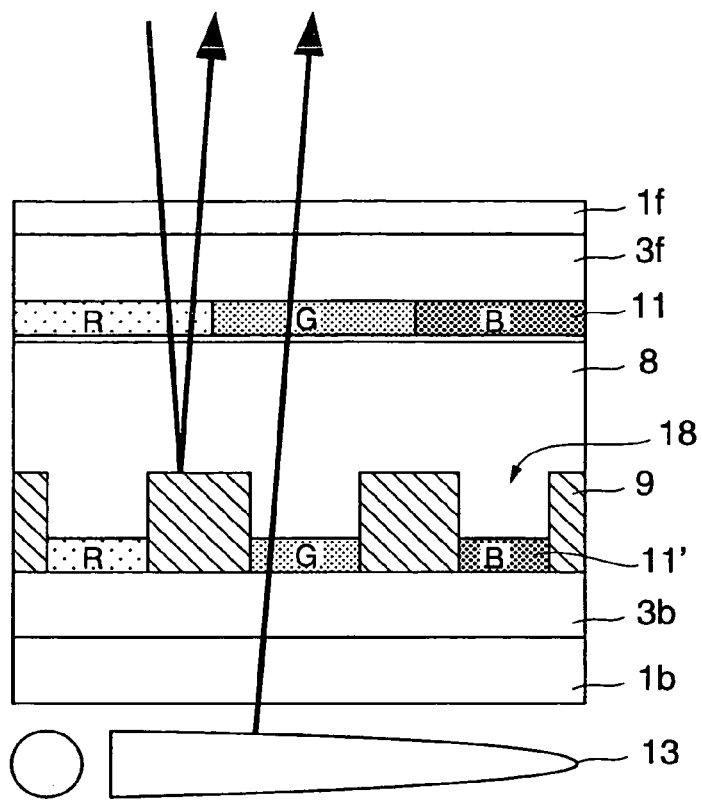
FIG. 12 is a schematic cross-sectional view of an example of a semi-transmission liquid crystal display device in a further embodiment of the present invention.
Figure 13:
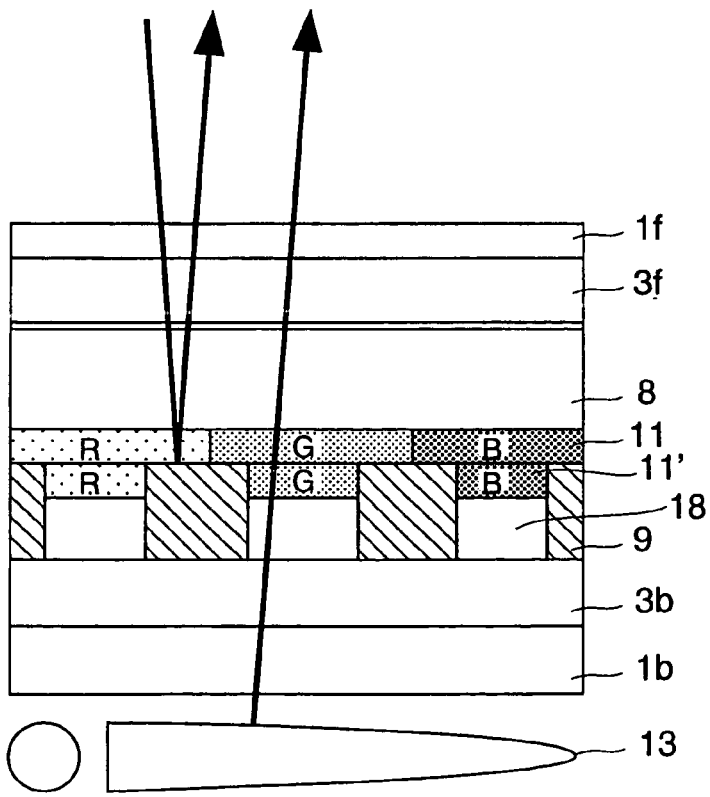
FIG. 13 is a schematic cross-sectional view of an example of a semi-transmission liquid crystal display device in another embodiment of the present invention.

FIG. 12 shows a further embodiment of the present invention wherein the second color filter layer 11' is disposed in a transparent layer portion which is a portion provided with an optical window 18 in the cholesteric layer. This arrangement can reduce the thickness of the liquid crystal display device per se. FIG. 13 shows another embodiment of the present invention. As shown in FIG. 13, the first color filter layer 11 may be disposed on the lower side of the liquid crystal layer 8.

Figure 14:
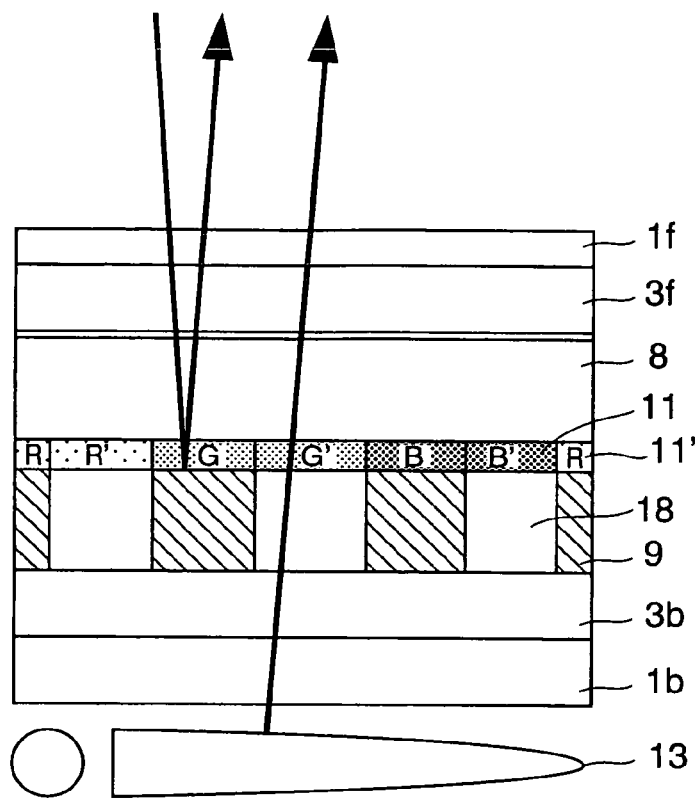
FIG. 14 is a schematic cross-sectional view of an example of a semi-transmission liquid crystal display device in still another embodiment of the present invention, wherein numeral 11 designates a color filter layer for a deep color and numeral 11' a color filter layer for a light color.
Figure 15:
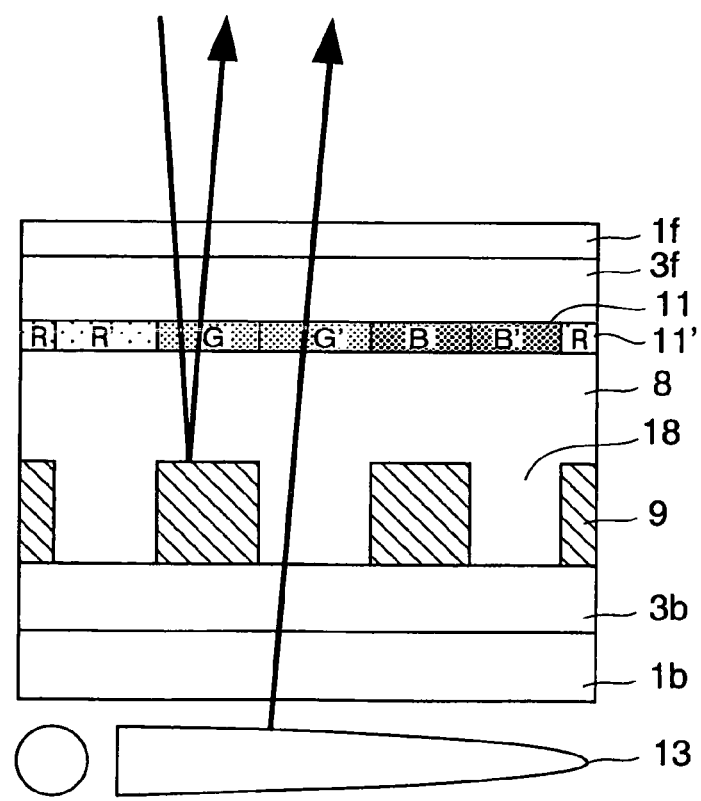
FIG. 15 is a schematic cross-sectional view of an example of a semi-transmission liquid crystal display device in a further embodiment of the present invention, wherein numeral 11 designates a color filter layer for a deep color and numeral 11' a color filter layer for a light color.

FIG. 14 is a schematic cross-sectional view of a display device according to still another embodiment of the present invention. In this embodiment, the light transmittance of the first color filter layer 11 has been partially regulated. Specifically, the optical density (transmittance) of the color filter layer 11 located on the upper part of the optical window 18 portion through which light from the backlight is transmitted is made higher than the optical density of the color filter layer 11' located on the upper part of the cholesteric layer portion free from the optical window. As a result, there is no difference in display color tone between transmission display and reflection display, and a display screen having an excellent color tone can be realized. As shown in FIG. 15, this color filter layer may be disposed on the upper part of the liquid crystal layer 8.

The above color filter may be formed by a method used in the formation of the conventional color filter, that is, by printing a dispersion of a pigment or a dye in a transparent medium such as acrylic resin on a transparent medium by an ink jet recording method. The color filter usable in the present invention can be simply prepared by regulating the optical density of the color filter layer by varying the content of the pigment or the like or the type of the pigment. For example, a color filter for deep R, light R, deep G, light G, and deep B, and light B, that is, a color filter for six colors, may be used.

The present invention has been described in conjunction with embodiments which are considered at this stage as being most practical and preferred. However, it should be understood that the present invention is not limited to the embodiments disclosed in the specification of this application and variations and modifications can be properly effected so far as they are not contrary to the subject matter or idea of the invention readable from the claims and whole specification, and a modified or varied board provided with a cholesteric layer and a display device provided with this board also fall within the technical scope of the present invention.

The invention claimed is:

1. A board, comprising:
    a light transparent substrate; and
    a cholesteric layer provided on the substrate;
    wherein the cholesteric layer is provided with an optical window portion of a predetermined pattern where the cholesteric layer is absent, and
    circularly polarized light is reflected on the cholesteric layer, and transmitted in the optical window portion.

2. The board according to claim 1, wherein a reflectance of circularly polarized light from the cholesteric layer is from 90 to 100%.

3. A semi-transmission liquid crystal display device comprising the board according to claim 1.

4. The semi-transmission liquid crystal display device according to claim 3, wherein an electric circuit is provided on a light transparent substrate-side of the cholesteric layer.

5. The semi-transmission liquid crystal display device according to claim 3, further comprising:
    a first color filter layer provided on at or above an upper part of the cholesteric layer; and
    a second color filter layer provided at or above an upper part of the optical window portion.

6. The semi-transmission liquid crystal display device according to claim 5, wherein the second color filter layer is provided in the optical window portion of the cholesteric layer.

7. The semi-transmission liquid crystal display device according to claim 3, wherein:
    a color filter layer is provided at or above an upper part of the cholesteric layer; and
    a first light transmittance of the color filter layer in a portion corresponding to the optical window portion is higher than a second light transmittance of the color filter layer in a portion of the cholesteric layer away from the optical window portion.

* * * * *